June 27, 1967 G. P. LINDBLOM ET AL 3,328,262
HETEROPOLYSACCHARIDE FERMENTATION PROCESS
Filed March 7, 1966
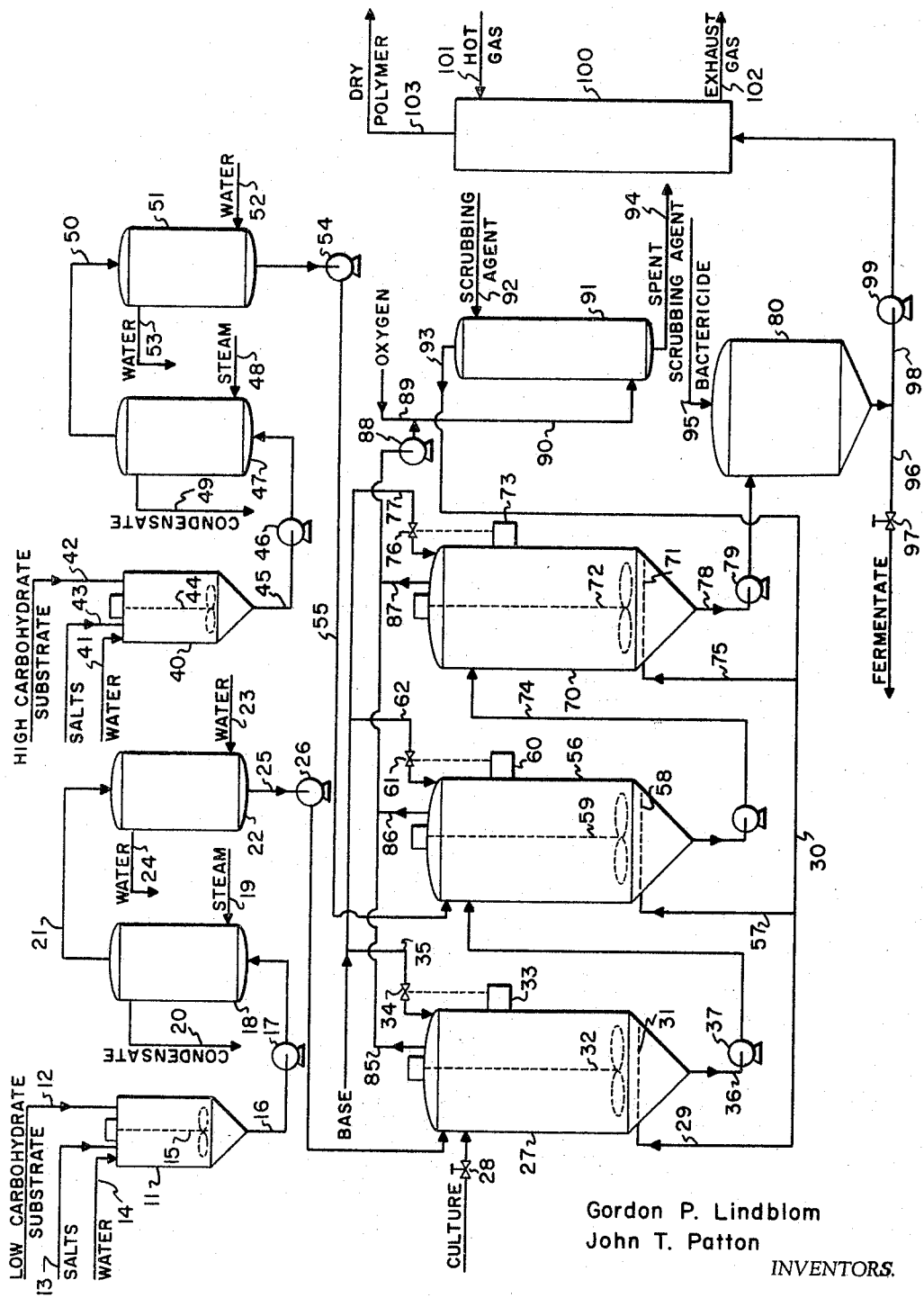
Gordon P. Lindblom
John T. Patton
INVENTORS.
BY James E. Reed
ATTORNEY

United States Patent Office 3,328,262
Patented June 27, 1967

3,328,262
HETEROPOLYSACCHARIDE FERMENTATION PROCESS
Gordon P. Lindblom and John T. Patton, both of Houston, Tex., assignors to Esso Production Research Company, a corporation of Delaware
Filed Mar. 7, 1966, Ser. No. 540,128
10 Claims. (Cl. 195—31)

This application is a continuation-in-part of Ser. No. 303,339, filed in the United States Patent Office on Aug. 20, 1963 and which is now abandoned.

The present invention relates to the production of water-soluble polymers and is particularly concerned with the production of heteropolysaccharides by the fermentation of carbohydrates with bacteria of the genus Xanthomonas.

Earlier work has shown that heteropolysaccharides produced by action of bacteria of the genus Xanthomonas on carbohydrates have potential applications as film forming materials; as thickeners or body building agents in edible products, cosmetic preparations, pharmaceutical vehicles, oil field drilling muds, fracturing fluids and similar compositions; and as emulsifying, stabilizing and sizing agents. The development of these uses has been delayed by the cost of producing the heteropolysaccharides. The process normally employed is a batch process requiring the inoculation of a sterile carbohydrate solution with Xanthomonas organisms, the fermentation of the inoculated solution for a period of from about 36 to about 72 hours under aerobic conditions, and the subsequent separation of the resultant polymer from the bacterial cells, unconverted carbohydrate, water and other constituents of the fermentate. Because of the time required for the fermentation of each batch, the low heteropolysaccharide content of the fermentate, and the processing required for the recovery and purification of the product, the heteropolysaccharides are expensive.

It has been suggested that the cost of producing the heteropolysaccharides might be reduced by employing a continuous fermentation process in lieu of the batch process referred to above. Efforts to develop such a continuous process in the past have been unrewarding. Tests have shown that continuous introduction of fresh medium and withdrawal of fermentate permits the continuous growth of bacterial cells but that this is not accompanied by continuous heteropolysaccharide production. Even though a multistage system including separate stages for cell growth and product formation is empolyed, the production of polymer ceases after a short time. The Xanthomonas organisms apparently undergo bacterial dissociation changes which destroy their ability to produce the heteropolysaccharide with seriously affecting the cell growth rate. This has effectively precluded the development of a continuous fermentation process.

The present invention provides a new and improved process for the production of heteropolysaccharides by fermenting carbohydrates with bacteria of the genus Xanthomonas which largely avoids the difficulties outlined above. In accordance with the invention, it has now been found that such heteropolysaccharides can be readily produced on a continuous basis by employing a multistage process in which bacterial cells are grown on a low carbohydrate medium in a first stage and cells free of substantial quantities of polymer are then fed into a second stage with a high carbohydrate medium for production of the heteropolysaccharides. Tests have shown that this use of multiple stages with a medium of controlled composition in each stage permits continuous production of the hetereopolysaccharides, reduces the time required for polymer synthesis, permits high heteropolysaccharide yields, and eliminates many of the other difficulties inherent in batch-type operations.

The exact nature and objects of the invention can best be understood by referring to the following detailed description of a continuous process for producing the heteropolysaccharides and to the accompanying drawing illustrating that process.

The process equipment depicted in the drawing includes a preparation vessel 11 in which a low carbohydrate culture medium used for growth of the bacterial cells is prepared continuously. A suitable nitrogen-containing substrate having a low carbohydrate content or essentially free of carbohydrate is introduced into the preparation vessel through line 12 from a source not shown. The substrate employed may consist of bouillon stock, blood serum, yeast extract, meat peptone, malt extract, milk peptone, distiller's solubles or the like. A variety of substrates consisting primarily of protein hydrolysis products are marketed commercially for use in culture media and will therefore be familiar to those skilled in the art. Salts such as dipotassium acid phosphate, sodium carbonate, and sodium chloride, if used in the medium, may be added through line 13. Exeprience has shown that many of the substrates available from commercial sources will permit satisfactory metabolism of the bacteria and that the addition of dipotasssium acid phosphate and other salts commonly employed in formulating culture media is therefore not always necessary. The water utilized in preparing the medium is added to the system through line 14.

The constituents from which the medium is prepared are mixed in preparation vessel 11 by means of agitator 15. The finished medium will normally contain protein hydrolysis products or a similar nitrogen-containing substrate in a concentration within the range between about 0.1% and about 10% by weight and will include less than about 0.5% by weight of carbohydrate. Media essentially free of carbohydrate are preferred. Dipotassium acid phosphate and other salts, if used, will generally be employed in concentrations between about 0.1 and about 0.5% by weight. The most effective concentration for a particular fermentation will depend to some extend upon the particular constituents used in the medium, the fermentation conditions employed and the particular strain of bacteria with which the fermentation is carried out. These concentrations may therefore be varied considerably. Specific formulations which have been found satisfactory include the following: (1) soy peptone, 0.7% by weight; magnesium sulfate, 0.2% by weight; and glucose, 0.2% by weight; (2) Basamin-Busch (a commercial culture nutrient marketed by Anheuser-Busch, Inc., St. Louis, Mo.), 0.5% by weight; magnesium sulfate, 0.2% by weight; and glucose, 0.2% by weight; (3) malt extract, 0.3% by weight; yeast extract, 0.3% by weight; meat peptone, 0.4% by weight; magnesium sulfate, 0.2% by weight; and glucose, 0.2% by weight; and (4) dipotassium acid phosphate, 0.2% by weight; yeast extract, 0.25% by weight; and meat peptone, 0.25% by weight. The percentages given are based on the total weight of the aqueous medium. Other suitable formulations of similar composition will readily suggest themselves to those skilled in the art.

Following preparation of the low carbohydrate or carbohydrate-free fermentation medium in vessel 11, the resulting aqueous solution is continuously pumped through line 16 by means of pump 17 to sterilization unit 18. The sterilization unit employed may comprise a heat exchanger, a jacketed vessel, a vat provided with an electrical heater or similar apparatus within which the medium can be heated to a temperature within the range between about 200° F. and about 275° F. and held at that temperature for a period of from about 2 to about 5 minutes or longer. Higher temperatures and longer residence time may be utilized if found necessary to render the medium sterile but in general the temperatures and times indicated above will be sufficient to kill any bacteria or spores present. The sterilization unit depicted in the drawing comprises a heat exchanger into which steam is introduced through line 19 and from which condensate is withdrawn through line 20. In lieu of such a unit, steam can be introduced directly into the medium to effect sterilization, suitable allowance being made for dilution by the condensing steam.

The sterile medium obtained as described above is generally withdrawn from the sterilization unit at a temperature between about 200° F. and about 275° F. and passed through line 21 into a cooling unit 22. The cooling unit represented in the drawing is a heat exchanger into which water or a similar cooling fluid is introduced through line 23 and subsequently withdrawn through line 24. A jacketed vessel, a vat containing cooling coils or other conventional cooling apparatus in which the medium can be cooled without contaminating it may be employed in lieu of such a heat exchanger. The temperature of the medium is dropped within the cooling unit to a point between about 75° F. and about 100° F., preferably to a temperature between about 75° F. and about 85° F. The cooled sterile medium is then discharged through line 25 and pumped by means of pump 26 into fermentation vessel 27.

The medium initially introduced into vessel 27 at the onset of the process is inoculated with a culture containing bacteria of the genus Xanthomonas. Representative species of the genus which may be utilized in accordance with the invention include *Xanthomonas begoniae, Xanthomonas campestris, Xanthomonas carotae, Xanthomonas hederae, Xanthomonas incanae, Xanthomonas malvacearum, Xanthomonas papavericola, Xanthomonas phaseoli, Xanthomonas pisi, Xanthomonas translucens, Xanthomonas vasculorum* and *Xanthomonas vesicatoria*. Cultures of these and other xanthomonads are contained in the American Type Culture Collection located in Washington, D.C. and in other repositories. Experimental work has shown that production of the heteropolysaccharides by the fermentation of carbohydrates is a characteristic trait of members of the genus Xanthomonas and that any of a variety of different species can therefore be employed for purposes of the invention. It has been found, however, that certain species produce the heteropolysaccharides more efficiently than do others and are therefore preferred. *Xanthomonas begoniae, Xanthomonas campestris, Xanthomonas pisi* and *Xanthomonas vesicatoria* are particularly outstanding in this respect.

Following inoculation of the medium in vessel 27, sterile gas containing oxygen is introduced into the medium through line 29 in order to provide the aerobic conditions necessary for metabolism of the organisms. It is generally preferred to introduce substantially pure oxygen into each stage of the process but sterile air or other oxygen-containing gas may be employed if desired. The gas may be injected from a recycle line 30 as will be pointed out hereafter or from an individual source if desired. It is preferred to pass the injected gas through a sparger or similar distribution device 31 located near the bottom of the vessel. Agitation in addition to that supplied by the gas as it bubbles upwardly through the medium may be provided by means of an agitator 32. Under the aerobic conditions in vessel 27, the organisms contained in the medium consume the substrate and rapidly multiply. Relatively little production of heteropolysaccharide takes place because of the low carbohydrate content of the medium but a small amount of polymer may be formed. This is accompanied by a decrease in the pH of the medium. In order to control this and maintain conditions favorable for the production of cells at a maximum rate, the vessel is provided with an electrode assembly or similar pH measuring equipment indicated by reference number 33. This equipment continuously measures the pH of the medium and actuates a motor driven valve 34 in line 35. Sodium hydroxide or a similar base is continuously or intermittently injected into vessel 27 in a concentration sufficient to counteract the acidity of the medium and maintain the pH at a level between about 6.0 and about 7.5, preferably between about 6.5 and about 7.2. In some cases a buffer can also be employed to control the pH of the medium. This latter system has certain disadvantages, however, and is generally not preferred. Fermentate containing bacterial cells produced in the initial stage of the process as described above but substantially free of heteropolysaccharides is withdrawn from vessel 27 through line 36 and circulated by means of pump 37 into the second stage of the process.

The high carbohydrate medium utilized in the second stage of the process is prepared continuously in a vat or mixing vessel 40. This vessel is provided with line 41 through which water is introduced into the system, with line 42 for the introduction of the carbohydrate to be employed as a substrate for production of the heteropolysaccharide, and with line 43 through which a bacterial nutrient and salt may be supplied if desired. A variety of carbohydrates can be fermented with the bacterial cells produced in the initial stage of the process to obtain the heteropolysaccharides. Suitable carbohydrates include glucose, sucrose, fructose, lactose, maltose, galactose, soluble starch, cornstarch, and the like. The carbohydrates utilized need not be in a refined state and hence crude products having a high carbohydrate content, raw sugar or sugar beet juice for example, may be employed. Unrefined carbohydrates such as these are generally less expensive than the purified materials and are therefore preferred for production of the heteropolysaccharide. Distiller's solubles or a similar material containing organic nitrogen and suitable trace elements will normally be used with the carbohydrate as a nutrient. Dipotassium acid phosphate and in some cases magnesium phosphate may also be utilized in the medium.

The addition of a nutrient and salts to the medium prepared in vessel 40 is not always essential. Experience has shown that the fermentate transferred from the first stage to the second stage of the process may contain sufficient nutrient and salts to permit continued growth of the bacteria and production of the heteropolysaccharide, particularly where raw sugar beet juice or a similar crude carbohydrate source material is used in the second stage. Many such materials contain organic nitrogen and trace elements in quantities sufficient for metabolism of the xanthomonads, even in the absence of nutrients and salts from a preceding stage, and hence the salts and nutrients may in some cases be omitted. The medium utilized will normally contain from about 1% to about 10% or more by weight of the selected carbohydrate, and may contain from about 0.01% to about 0.5% by weight of dipotassium acid phosphate, and from about 0.1% to about 10% of the nutrient.

The medium which is thus prepared in vessel 40 is withdrawn from the vessel through line 45 and circulated by means of pump 46 into a second sterilization unit. The sterilization unit may be similar to that described earlier and may comprise a heat exchanger, a vessel containing an electrical heater or similar apparatus 47 in which the medium can be heated to a temperature of from about 200° F. to about 275° F. and held at that temperature for a period of from about 2 to about 5 minutes or longer. Again higher temperatures may be utilized if necessary to kill specific bacteria or spores present in the medium but the times and temperatures indicated will generally be sufficient. The sterilization unit shown is a countercurrent heat exchanger into which steam or other heating fluid is introduced through line 48 and from which condensate is withdrawn through line 49. Direct injection of steam may also be employed for sterilization purposes if desired.

The high carbohydrate medium is withdrawn from the sterilization unit at a temperature within the range between about 200° F. and about 275° F. through line 50 and passed into cooling unit 51. Here the temperature is reduced to the fermentation temperature, between about 70° F. and about 100° F. The medium is preferably cooled to a point between about 75° F. and about 85° F. The cooling unit shown in the drawing comprises a countercurrent heat exchanger into which water or other cooling fluid is introduced through line 52 and from which it is subsequently withdrawn through line 53. Again a jacketed vessel or other conventional cooling apparatus may be utilized in lieu of such a heat exchanger. The cooled medium is circulated by means of pump 54 through line 55 into the second stage fermentation vessel 56.

Vessel 56 may be substantially identical to vessel 27 in the first stage of the process but will normally have a somewhat greater capacity. Oxygen-containing gas is introduced into the lower part of the vessel through line 57 and sparger 58 in order to maintain the required aerobic conditions. An agitator 59 may be utilized to provide additional agitation of the medium as fermentation progresses. The pH of the medium is measured by means of cell or electrode assembly 60. The signal derived from the assembly actuates valve 61 in line 62 to permit the continuous or intermittent addition of base in sufficient quantities to counteract the acidity of the fermentation products and maintain the pH between about 6.0 and about 7.5. A pH between about 6.5 and 7.2 is again preferred.

As fermentation takes place in the second stage of the process, the carbohydrate in the medium introduced through line 55 is converted into heteropolysaccharide by enzyme produced by the cells in the fermentate from the preceding stage. A marked increase in viscosity due to the formation of the polymer occurs. In order to secure effective utilization of the carbohydrate, it is preferred that the fermentation reaction be continued until the fermentate has a viscosity in excess of about 70 centipoises when diluted with 5 parts of distilled water and tested with a Brookfield viscometer and UL adaptor at 3 r.p.m. This may be done in two stages as described above. It is sometimes preferred, however, to utilize three or more stages as shown in the drawing. This reduces the residence time required in the second stage and generally permits greater efficiency. In lieu of this, two or more vessels connected in parallel may be utilized as the second stage.

As indicated in the preceding paragraph, the system shown in the drawing includes a third stage containing fermentation vessel 70. This vessel may be essentially identical to the vessels described earlier and may include a sparger or similar device 71, an agitator 72, and an electrode assembly or other means 73 for measuring the pH. Fermentate from the second stage is introduced into the third stage through line 74. The required aerobic conditions are provided by the introduction of oxygen into the sparger through line 75. A control valve 76 in line 77 is utilized to maintain the pH at the proper level as in the earlier stages. Fermentate containing the heteropolysaccharide, bacterial cells and unconverted carbohydrate is withdrawn from the third stage through line 78 and passed by means of pump 79 into fermentate storage vessel 80.

The gas evolved during the fermentation reaction normally includes unconsumed oxygen, carbon dioxide liberated by the bacteria, and water vapor. This gas can be sterilized by passing it through a bacterial filter, a bactericidal solution or a heating unit and may then be vented to the atmosphere. It is generally preferred, however, to recycle the gas and thus improve oxygen utilization in the process. As shown in the drawing, this is done by collecting the off-gas from each stage of the process in lines 85, 86 and 87 and passing the combined stream to a compressor 88. Here the pressure is boosted to a level sufficient to overcome the pressure drop through the system. Moderate pressures of from about 10 to about 100 lbs. per square inch will normally be employed at the discharge side of the compressor. Makeup oxygen-containing gas is added downstream of the compressor through line 89. The enriched gas is then injected through line 90 into the lower part of a scrubber 91. The upflowing gas is contacted in the scrubber with a downflowing solution of calcium hydroxide, sodium carbonate, sodium hydroxide, potassium hydroxide, potassium carbonate, ethanol amine or the like introduced through line 92. Gas relatively free of carbon dioxide and enriched in oxygen is taken overhead from the scrubber through line 93 and returned to main supply line 30. The spent scrubbing agent is removed from the lower part of the scrubber through line 94 and may be processed for the recovery of carbon dioxide if desired. This recycling of the gas reduces the volume of gas which must be handled in the system, permits the use of a smaller compressor and other equipment, reduces foaming of the fermentate, and minimizes solids carryover in the gas stream from the fermentation vessel. The use of essentially pure oxygen as makeup gas simplifies the gas sterilization procedure and permits the use of a bacterial filter to remove any microorganisms without the difficulties normally encountered when filters are employed for sterilization of the total gas stream. The recycling of gas from one or more vessels is therefore preferred.

The fermentate discharged from the third state of the process into storage vessel 80 normally contains live bacteria. The xanthomonads are plant pathogens and must be killed before the fermentate is removed from the system. This may be done by the addition of a bactericide to the storage vessel as indicated at line 95. In lieu of adding a bactericide, the fermentate may be heat sterilized to kill the microorganisms and spores. Where a dry product is not required, the fermentate may be withdrawn from the system through line 96 containing valve 97. Tests have shown that the fermentate thus recovered is useful in oil field drilling fluids an in certain other applications where product purity is not highly critical. Alternately, the fermentate may be circulated through line 98 by means of pump 99 into a suitable dryer designated by reference numeral 100. The dryer employed may be a spray dryer, a tunnel dryer, a tray dryer, a rotary vacuum dryer or other conventional drying device. Hot gas will normally be injected into the dryer as indicated by line 101; while exhaust gases are withdrawn through line 102. The dried fermentate is recovered through line 103. The dry fermentate is normally a soft, finely divided powder having a yellowish color similar to that of the liquid fermentate. This material is useful in oil field drilling fluids and similar compositions.

In lieu of drying the whole fermentate as described in the preceding paragraph, it is often preferable to separate the heteropolysaccharide from the liquid fermantate and dry only the polymer thus recovered. The separation may be carried out by first filtering or centrifuging out the bacterial cells if desired and then (1) treating the liquid fermentate with methanol, acetone or other organic solvent in the presence of a potassium chloride solution, a sodium chloride solution or similar electrolyte; (2) adding polyvalent cations to the fermentate and raising the pH to a value in excess above about 8.5, preferably in excess of about 10; or (3) reacting the heteropolysaccharide with a quaternary ammonium compound. In each case the polymer is precipitated and can be recovered from the resultant slurry by filtration or centrifugation. The material may be washed, redissolved and reprecipitated to obtain a product of high purity suitable for use in foodstuffs, pharmaceuticals and similar products.

It will be apparent from the foregoing that the process of the invention permits the continuous production of heterpolysaccharides by the action of bacteria of the genus Xanthomonas on carbohydrates and thus avoids many of the difficulties encountered in batch-type operations. The process is not limited to three stages as shown in the drawing and may be carried out with only two stages or with three or more stages. Various modifications in the equipment employed in carrying out the apparatus may be made without departing from the scope of the invention and will be apparent to those skilled in the art.

The nature and objects of the invention are further illustrated by the following examples:

*Example I*

Three fermentors were connected in series and provided with agitators, aeration devices, pH control systems and other auxiliary equipment intended to permit three stage continuous fermentation. An aqueous fermentation medium containing 3 wt. percent raw sugar, 0.1 wt. percent dipotassium acid phosphate, and 0.5 wt. percent Stimuflav, a commercial distiller's solubles marketed by Hiram Walker & Sons, was prepared for use in this system. This medium, after sterilization, was introduced into the first of the fermentors and inoculated with a viable culture of Xanthomonas campestris organisms. Air and agitation were provided at rates sufficient to permit rapid growth of the bacteria. The organisms were permitted to grow batchwise in the first fermentor for a period of about 48 hours at a pH of about 7. Samples withdrawn at intervals during this period showed that the bacteria were growing satisfactorily and producing heteropolysaccharide in appreciable quantities.

At the end of the period referred to above, the system was changed from a batch system into one in which medium passed from one fermentor to the next with a residence time of about 12 hours in each stage. Fresh medium having the composition set forth above was continuously introduced into the first stage; while fermentate was continuously withdrawn from the third stage into a collection vessel. The pH, aeration and agitation were controlled in each stage to promote cell growth and production of the heteropolysaccharide. Samples of the medium from each stage were withdrawn at periodic intervals. Inspection of the samples showed that the organisms continued the production of cells following the initiation of continuous three stage operation but that production of the heteropolysaccharide ceased in a very short time. Similar results were obtained in other two stage and three stage operations in which the feed rate and other operating variables were changed in an effort to secure continuous polymer production. In every case it was found that the bacteria apparently lost their ability to synthesize the enzyme responsible for formation of the polymer, even though cell growth continued, and that the heteropolysaccharide could therefore not be produced on a continuous basis.

*Example II*

Additional tests similar to those described above but utilizing two separate media were carried out. The first fermentor was initially charged with a medium containing 0.2 wt. percent raw sugar, 0.2 wt. dipotassium acid phosphate, 0.2 wt. percent magnesium sulfate heptahydrate, 0.3 wt. percent malt extract. 0.4 wt. percent peptone, and 0.3 wt. percent yeast extract. The medium in the first fermentator was then inoculated with Xanthomonas campestris organisms and supplied with aeration and agitation to promote fermentation. This was continued under batch conditions for a period of about 48 hours, at the end of which it was found that the organisms had grown vigorously but that very little heteropolysaccharide had been produced. The sugar content of the medium was below the level required for effective polymer production.

At the end of the 48 hour period, continuous operation was initiated by pumping fresh medium into the first fermentor, transferring medium containing live bacteria from the first fermentor to the second fermentation vessel at a rate sufficient to give an average residence time of 6.6 hours in the first vessel; injecting a carbohydrate solution containing 15 wt. percent raw sugar, 0.01 wt. percent dipotassium acid phosphate and 0.4 wt. percent magnesium sulfate heptahydrate into the second vessel at ⅓ the rate that medium was transferred thereto from the first vessel; and withdrawing product from the second vessel at a rate sufficient to give an average residence time of 17.5 hours in the second vessel.

The third fermentor was placed in operation after a very slight trace of heteropolysaccharide was detected in the second vessel. The flow rates in the system were then adjusted to give an average residence time of 6.6 hours in the first fermentor, an average of 12.5 hours in the second, and an average of 12.5 hours in the third. Samples were thereafter taken from each vessel at periodic intervals over a period of about 95 hours.

Optical density measurements made on the samples recovered from the first fermentor gave values ranging between about 0.95 and about 1.00, indicating that the cell population remained reasonably constant after the flow rates were adjusted and equilibrium conditions has been established. The bacteria thus grew continuously but produced no significant quantity of heteropolysacchardie in the first vessel. Samples taken from the second and third fermentors showed that substantial quantities of heteropolysaccharide were produced in both vessels. The viscosity of the medium in the second vessel reached a value of about 5 centipoises, measured after dilution with 5 parts of distilled water, and thereafter remained relatively constant; whereas that in the third vessel increased rapidly and then leveled off at a value of about 74 centipoises, again measured after dilution with 5 parts of distilled water.

It is apparent from the above results that production of the heteropolysaccharide does not continue in systems in which the medium composition is the same in all of the fermentors. Although satisfactory cell growth takes place, the bacteria apparently lose their ability to synthesize the polymer. By employing a medium substantially free of carbohydrate in the first stage, transferring medium containing viable cells but substantially free of heteropolysaccharide from the first stage to the second stage, and introducing carbohydrates into the system in the second stage, continuous production of the heteropolysaccharide can be obtained. This alleviates many of the difficulties encountered in batch operations and permits production of the polymer at lower cost than has generally been possible heretofore.

What is claimed is:

1. A process for the production of a heteropolysaccharide by the fermentation of a carbohydrate with bacteria of the genus Xanthomonas which comprises:
    (a) continuously introducing a sterile, nitrogen-containing bacterial medium into a first fermentation vessel containing viable bacteria of the genus Xanthomonas while controlling the temperature, pH, oxygen level and residence time in said first vessel to promote the growth of bacterial cells, the carbohydrate content of said medium being insufficient to permit the formation of heteropolysaccharide in said first vessel in substantial quantities;
    (b) continuously transferring medium containing viable bacteria of the genus Xanthomonas from said first vessel to a second fermentation vessel while controlling the temperature, pH, oxygen level and residence time in said second vessel to promote the formation of heteropolysaccharide;
    (c) continuously introducing carbohydrate into said second vessel from an external source in quantities sufficient to permit the formation of heteropolysaccharide in said second vessel in substantial quantities; and
    (d) continuously withdrawing fermentate containing heteropolysaccharide in substantial quantities from said second vessel.

2. A process as defined by claim 1 wherein said medium introduced into said first vessel contains less than about 0.5 wt. percent carbohydrate.

3. A process as defined by claim 1 wherein sufficient carbohydrate is introduced into said second vessel from said external source to raise the carbohydrate content of the medium to a level between about 1.0 and about 10.0 wt. percent.

4. A process as defined by claim 1 wherein said bacteria are *Xanthomonas campestris*.

5. A process as defined by claim 1 wherein said carbohydrate is introduced into said second vessel from said external source as a raw sugar solution.

6. A process as defined by claim 1 wherein said bacteria are *Xanthomonas vesicatoria*.

7. A process as defined by claim 1 including the additional steps of transferring the fermentate withdrawn from said second vessel to a third fermentation vessel while controlling the temperature, pH, oxygen level and residence time in said third vessel to promote formation of heteropolysaccharide and withdrawing from said third vessel fermentate having a higher heteropolysaccharide content than the fermentate withdrawn from said second vessel.

8. A process as defined by claim 1 including the steps of continuously withdrawing gases from one or more of said vessels, treating the withdrawn gases to increase their oxygen content, and recycling said gases.

9. A process as defined by claim 1 wherein said medium introduced into said first vessel contains protein hydrolysis products and is essentially free of carbohydrates.

10. A process as defined by claim 1 wherein said carbohydrate from said external source is introduced in the form of sugar beet juice.

References Cited

UNITED STATES PATENTS

| | | | |
|---|---|---|---|
| 3,015,612 | 1/1962 | Pirt et al. | 195—142 X |
| 3,020,206 | 2/1962 | Patton et al. | 195—31 |
| 3,062,724 | 11/1962 | Reusser | 195—139 X |
| 3,232,929 | 2/1966 | McNeely | 195—31 |

A. LOUIS MONACELL, *Primary Examiner.*

A. E. TANENHOLTZ, *Assistant Examiner.*